(12) United States Patent
Corghi

(10) Patent No.: US 6,761,061 B2
(45) Date of Patent: Jul. 13, 2004

(54) DEVICE FOR TUBELESS TIRE BEAD ENGAGEMENT AND INFLATION

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 10/376,712

(22) Filed: Mar. 3, 2003

(65) Prior Publication Data

US 2003/0167833 A1 Sep. 11, 2003

(30) Foreign Application Priority Data

Mar. 7, 2002 (IT) .................................... RE2002A0016

(51) Int. Cl.[7] .......................................... G01M 17/02
(52) U.S. Cl. .......................................................... 73/146
(58) Field of Search ............................ 73/146; 157/1.1, 157/1, 1.17, 1.2, 1.21

(56) References Cited

U.S. PATENT DOCUMENTS

| | | | | |
|---|---|---|---|---|
| 3,552,469 A | * | 1/1971 | Corless | 157/1.1 |
| 3,675,705 A | * | 7/1972 | Corless | 157/1.1 |
| 3,710,837 A | * | 1/1973 | Blomgren et al. | 157/1.21 |
| 3,866,654 A | | 2/1975 | Duquesne | |
| 4,804,029 A | | 2/1989 | Glogovsky | |
| 5,042,547 A | * | 8/1991 | Van De Sype | 157/1.1 |
| 5,247,982 A | * | 9/1993 | Miller | 157/1.1 |
| 5,570,733 A | * | 11/1996 | Desparois et al. | 157/1.1 |

* cited by examiner

Primary Examiner—William Oen
(74) Attorney, Agent, or Firm—Browdy and Neimark, P.L.L.C.

(57) ABSTRACT

Device for tubeless tire bead engagement and inflation, generally for tire removal machines (1) having a unit for supporting and locking a wheel (wheel rim+tire) (5–15) in a bedded position, comprises a movable implement to be associated with the structure of the tire removal machine, and generally shaped as a handlebar the handles (9) of which are lowerly provided with at least one compressed air delivery nozzle (11), said handlebar being able to move between a rest position in which it is spaced from said bedded wheel, and a working position in which said nozzles, retained thereat by the operator, extend beyond the upper bead retention flange (55) of the wheel rim (5) to blow air below it at the command of said operator.

6 Claims, 4 Drawing Sheets

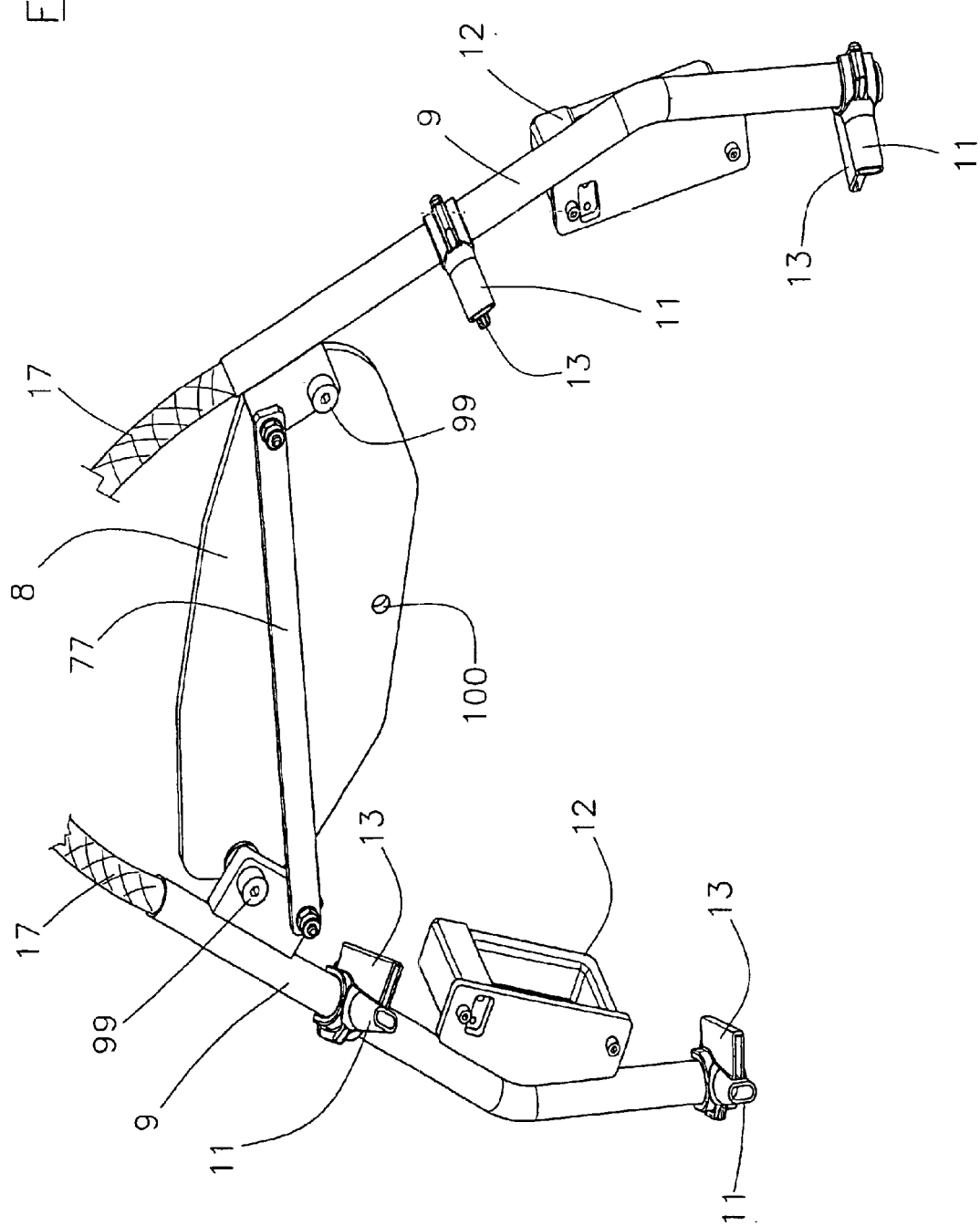

DEVICE FOR TUBELESS TIRE BEAD ENGAGEMENT AND INFLATION

BACKGROUND OF THE INVENTION

1. Technical Field of the Invention

OBJECT AND SUMMARY OF THE INVENTION

2. Prior Art

This invention relates in a totally general sense to tires without an inner tube and, more particularly, concerns a device for their inflation.

Said tires without an inner tube, generally known as tubeless tires, have their beads suitably dimensioned and shaped, with the corresponding wheel rims presenting matching bead retention flanges with which said beads must necessarily make tight contact to form the seal.

Various systems are known for inflating such tires when locked on a usual tire removal machine, which is generally provided with a unit for supporting and locking the wheel (wheel rim+tire) in a bedded position, for example a self-centering unit.

A first known system comprises a hollow annular body provided with a circumferential series of orifices and connected to a compressed air source, and combined with a flexible hose, also connected to said source, to be coupled to the tire inflation valve.

To inflate the tire of said first known system, the lower bead (i.e. that facing the self-centering unit) must firstly be brought into contact with the respective wheel rim flange, after which the upper bead must be inserted into the channel of the wheel rim, flush with its seat.

Having done this the hollow annular body is disposed above the gap between the tire upper bead and the upper flange of the wheel rim, with the respective orifices orientated towards said gap; the flexible hose is connected to the inflation valve; and the two are fed with compressed air.

The simultaneous action of the two air flows creates a pressure pulse within the tire, with the result that the upper bead is urged into its seat in the wheel rim, after which the tire is inflated with the air fed through the inflation valve.

Said first known system has proved unsatisfactory because to operate on wheel rims of different nominal diameters correspondingly different hollow annular holed bodies are required, with all the ensuing problems.

In the second known system the jaws of the self-centering unit are provided with at least one through hole generally orientated towards its axis of rotation, and connected to a compressed air source via a valve.

In this case to inflate the tire, the upper tire bead must firstly be made to engage the respective wheel rim seat, then the lower side wall of the tire has to be raised to suitably distance the lower bead from its seat, after which the compressed air is fed in through the holes in the jaws.

By being suddenly fed into the tire through the gap created in this manner, the compressed air produces a pressure shock which causes the tire lower bead to tightly adhere to its seat in the wheel rim.

After said shock any intervention by the operator is obviously no longer necessary.

Said second known system has firstly proved uncomfortable because the operator has to maintain the tire raised, and is secondly generally complex and costly because it requires a rotary joint associated with the self-centering unit to enable the air to reach the jaws.

A third known system comprises two separate members disposed on one and the other side of the axis of the wheel locking unit, they being provided with respective air delivery apertures which face generally downwards and are each positioned on a manipulating and positioning unit provided with locking means.

Before proceeding to inflate a tire, its lower bead has to be engaged with the respective wheel rim seat, while the upper bead is at a distance from the respective flange of the wheel rim.

Having done this the operator positions said units such that said apertures are aligned with the annular gap existing between the wheel rim and the upper bead; he then locks the whole assembly in position and commands the arrival of the compressed air, which generally operates as already stated.

This third known system has also highlighted various problems, which can be summarized as follows.

Firstly it is generally bulky and complex because of the presence of said two separate members and the relative accessories.

Secondly the separate positioning of said two units and of their respective locking means involves relatively complex and lengthy operations.

Thirdly such a system can be dangerous should the operator omit to lock the component elements of the system in position.

This is because in such situations at least some of said elements, no longer retained due to said omission, can undergo untimely movement because of the sudden reaction thrust generated on opening the compressed air.

The main object of this invention is to provide means able to overcome the aforesaid problems.

Another object of the invention is to attain said main object within the context of a simple, rational, reliable and flexible construction which is of small overall size, of low cost and safe.

With regard in particular to said safety problem, according to the invention the device is structured such as to compel the operator to retain it in position during tire inflation, otherwise said inflation cannot proceed.

For this purpose the device of the invention comprises a movable implement generally shaped as a symmetrically deformable handlebar intended to be associated with a fixed part of a tire removal machine, and provided with at least two air delivery nozzles which can only be activated by the operator gripping the handlebar with both hands.

The device can be readily and easily manipulated and positioned both because of said handlebar shape and because it is suitably counterweighted to automatically assume its rest configuration when released.

Moreover, with regard to the flexibility of utilization of the invention, the aperture between the arms or handles of the handlebar can be advantageously adjusted readily by the operator in order to adapt it to the nominal diameter of the wheel rim.

These other characteristics of the invention, together with the constructional merits and details thereof, will be apparent from the ensuing detailed description given with reference to the figures of the accompanying drawings which illustrate a preferred embodiment thereof by way of non-limiting example.

BRIEF DESCRIPTION OF THE DRAWINGS

FIG. 3 is a perspective view thereof taken from below.

DETAILED DESCRIPTION OF THE PREFERRED EMBODIMENT OF THE INVENTION

Figure 1:
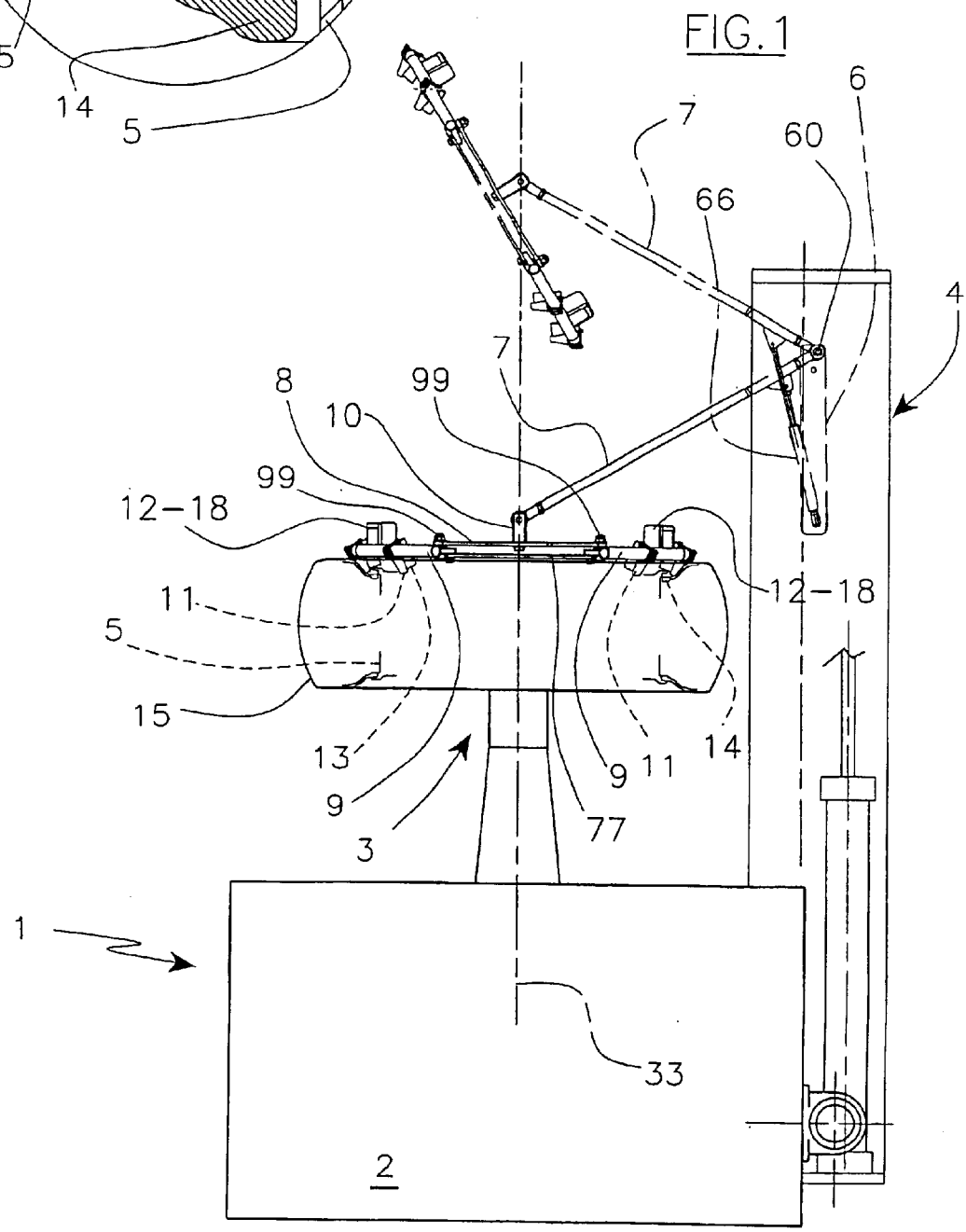
FIG. 1 is a schematic front view of a usual tire removal machine with which a device of the invention is associated, this latter being shown in two opposing operative positions, namely its raised or rest position and its lowered or working position.
Figure 2:
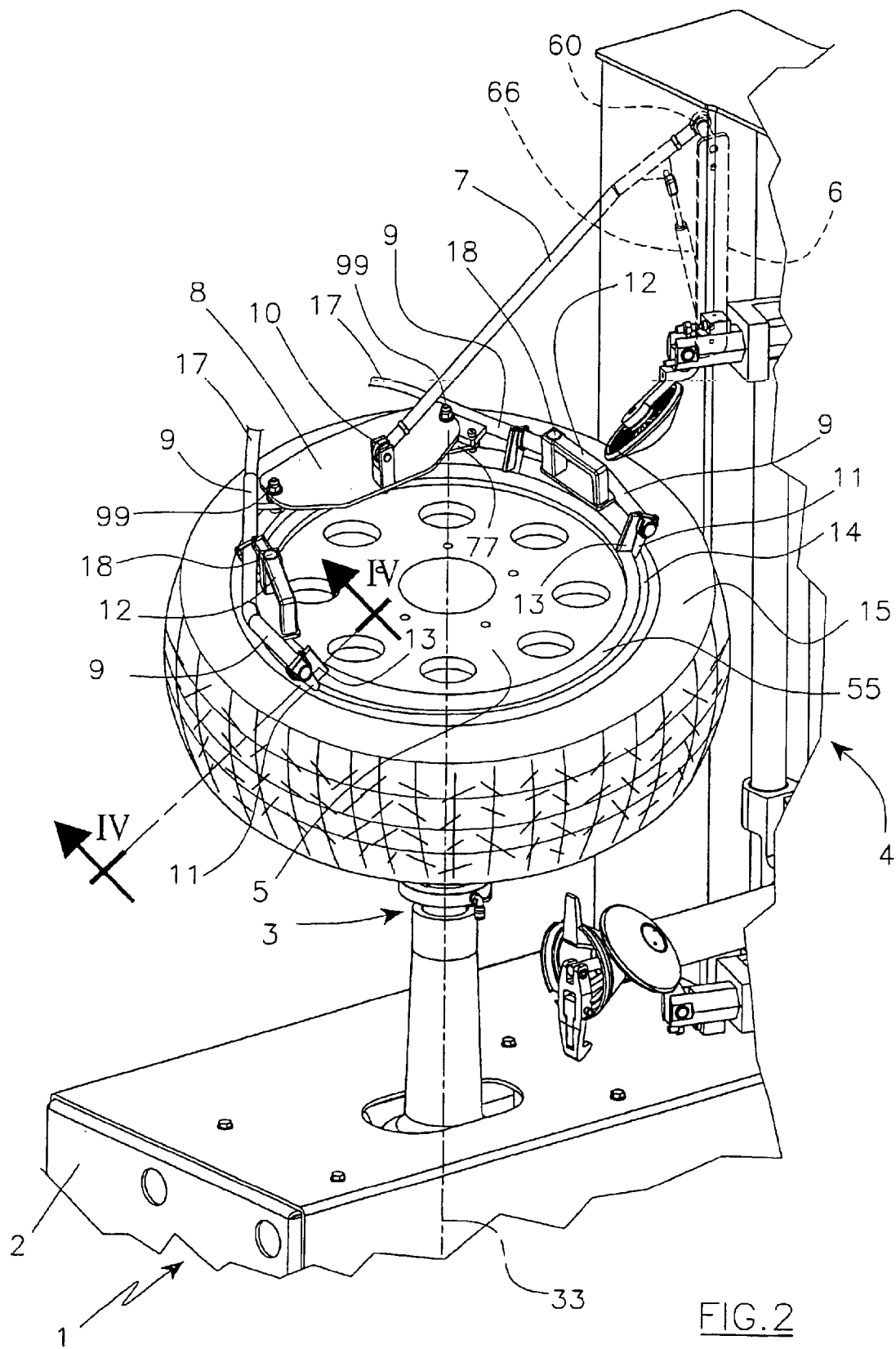
FIG. 2 is a perspective view from above showing the device in its working position.

Said figures, and in particular FIGS. 1 and 2, illustrate a tire removal machine, indicated overall by the reference numeral 1, which is shown schematically as it is substantially extraneous to the invention.

In this respect the teachings of the invention can be easily adapted to all types of tire removal machines having a unit for supporting and locking a wheel (wheel rim+tire) in a bedded position.

In the present case the tire removal machine 1 comprises a base frame 2 from which there upwardly projects a rotatable vertical shaft 3, at the top of which there are provided the means for locking the wheel rim 5, these not being shown for reasons of clarity and simplicity.

The frame 2 presents a tool turret 4 which also carries the device of the invention.

This comprises a plate 6 which is fixed to the turret 4 and carries, hinged thereto on a substantially horizontal axis 60, one end of a profiled arm 7 which extends towards the shaft 3.

Between said plate 6 and said arm 7 there is interposed a gas spring is 66 arranged to maintain the arm 7 constantly urged into its raised rest position (shown by dashed lines in FIG. 1).

Equivalent means for this purpose could instead be provided, such as a helical tension or compression spring, a torsion spring or a leaf spring.

The same results are also attained if instead of the counterweight system defined by the arm 7 and the gas spring 66, a descending cable is provided hooked to a system of upwardly/downwardly movable type.

A blower implement, generally in the form of a flat handlebar (see FIGS. 2 and 3), is suspended from the opposite end of the arm 7.

Said handlebar is defined by a plate 8 positioned to the side of the axis 33 of the rotatable shaft 3, and by two tube pieces 9 positioned on one and the other side of said axis 33, these being slightly bent such that their concave parts face said axis 33.

As can be seen in FIG. 3, the front edge of the plate 8 presents a central hole 100 forming the coupling seat for an articulated suspension.

Said suspension is in the form of a fork 10, the crosspiece of which is pivoted to said hole 100, said arm 7 being pivoted to the fork arms. The first of said two pivotings enables the handlebar to be rotated within the plane in which it lies, the second enabling it to be rotated within the vertical plane containing the handlebar support arm 7.

Said two tube pieces 9, forming the handles of said handlebar, are projectingly pivoted to the opposing ends of the plate 8 on the axes indicated by 99.

Said pivotings 99 enable the distance between the handles 9 to be adjusted in order to adapt it to the nominal diameter of the wheel rim 5 on which it is to intervene.

The two handles 9 are linked together in such a manner that they oscillate symmetrically during their opening and closure.

In the illustrated example this is achieved by a connecting rod 77 (see FIGS. from 1 to 3) which connects together the handles 9 in proximity to their respective pivotal axes 99, its longitudinal axis intersecting the plane containing the two axes 99 (FIG. 3).

Alternatively this can be achieved by two mutually engaging toothed sectors rigid with the handles 9, and having their centers coinciding with said axes 99.

As a variant the distance between the handles 9 can be adjusted by a manually controlled linkage system in the form of a male-female thread combination.

Moreover, as an aid in adapting the aperture between the handles 9 to the nominal diameter of the wheel rim 5, at least one of said handles 9 can be provided with an index with corresponding reference markings on the plate 8 relative to the nominal diameters of currently available wheel rims.

Figure 4:
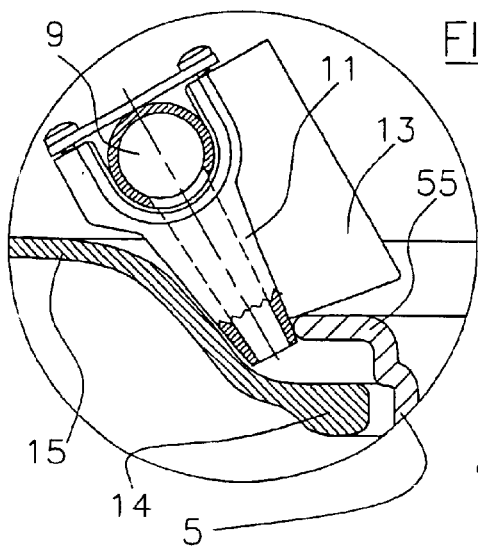
FIG. 4 is a part of the section IV–IV of FIG. 2, shown on an enlarged scale.

Starting from the respective pivoting 99, each individual handle 9 comprises a first lower air delivery nozzle 11, an upper manipulation and control handgrip 12, and a second lower air delivery nozzle 11. Each nozzle 11 is orientated downwards, and is inclined towards the shaft 3 where it presents an exit mouth of elongate form (FIG. 3) arranged to lie against the bead retention flange 55 of the wheel rim 5 (FIG. 4).

The nozzle 11 communicates with the handle 9 (see FIG. 4), which is closed at one end, its opposite end being connected to a flexible service hose 17 (FIGS. 2 and 3).

The two hoses 17 are preferably connected to a compressed air source via a common valve unit, which will be described hereinafter. In addition, to the inner side of the nozzle 11 there is fixed a fin 13, the lower edge of which is situated to the rear of the exit mouth of the nozzle 11.

In this manner a right angled recess is formed able to engage the peripheral edge of the bead retention flange 55 in such a manner as to position the exit mouth of the nozzle 11 below said peripheral edge and within the gap existing between said bead retention flange 55 and the bead 14 of the tire 15.

Moreover, as shown in FIG. 2, each handgrip 12 is provided with a control member 18 with which to activate the arrival of compressed air to the two handles 9 of the shaft.

The two members 18 are operatively connected together and to said common valve unit to allow the compressed air to reach the nozzles 11 only if said two members 18 are both activated.

For this purpose the members 18 can consist for example of pneumatic or electronic switching valves connected in series and to said common valve unit.

Figure 5:
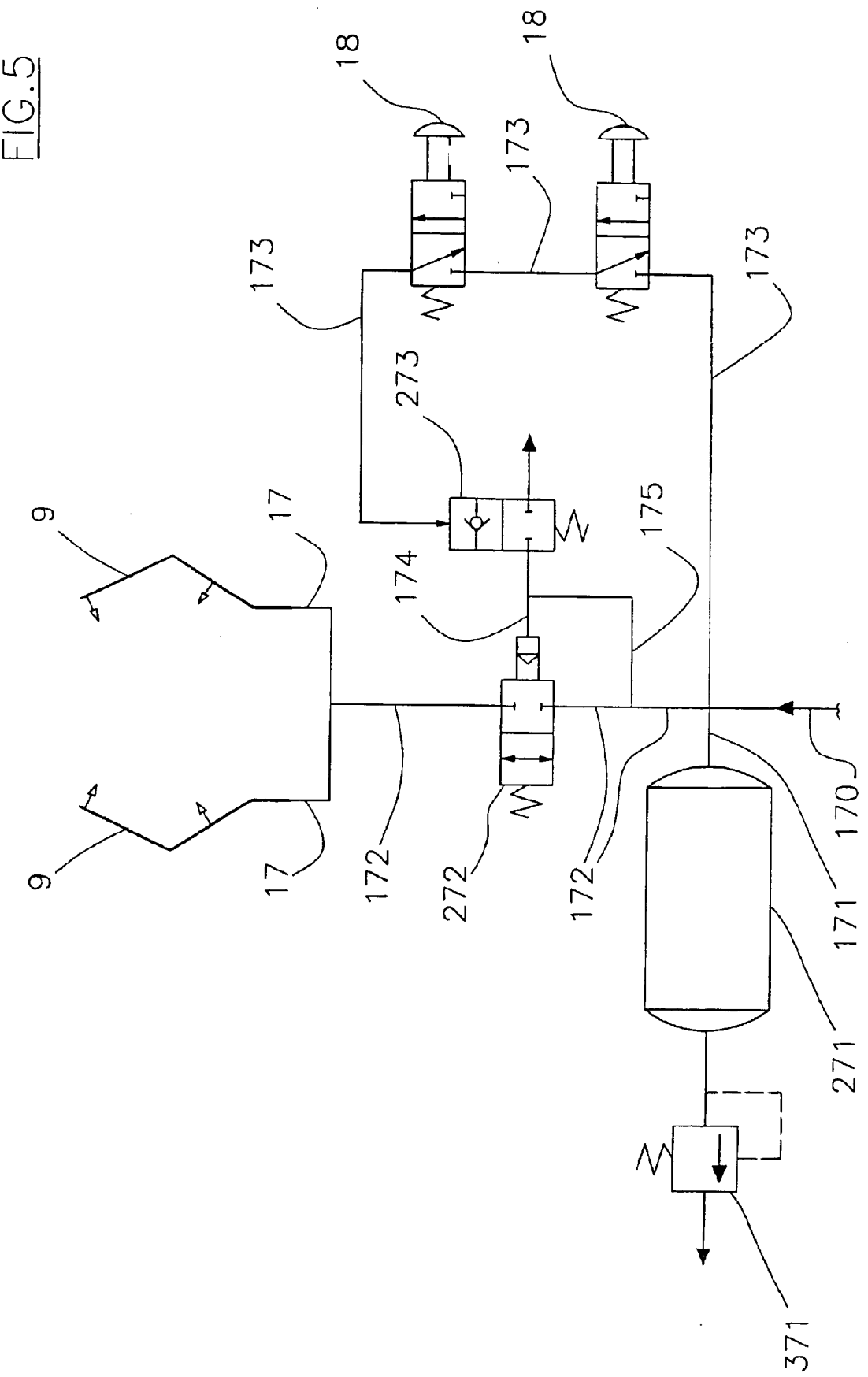
FIG. 5 is a scheme showing the feed system for the compressed air delivery nozzles of the device.

The aforestated is illustrated by way of example in FIG. 5, which shows a compressed air arrival conduit 170 connected to a suitable source and presenting three branches indicated by 171, 172 and 173 respectively.

The first 171 of said branches opens into a reservoir 271 provided with an overpressure valve 371. The second branch 172 is connected to the two flexible hoses 17 by way of a closing and opening valve 272, which constitutes the aforesaid common valve unit.

The third branch 173 is connected at its end to a change-over valve 273, and is intercepted by said control members 18, which are connected in series and are generally in the form of cocks.

There are also provided a vent conduit 174 which connects the closing and opening valve 272 to the change-over valve 273, and a branch 175 which connects the vent conduit 174 to the second branch 172.

The aforedescribed device operates substantially in the following manner.

At the commencement of operations, the handlebar occupies its raised rest position shown in FIG. 1; the pneumatic air feed system is disconnected from the handles 9 as shown in FIG. 5; and the tire 15 has its lower bead engaged with its seat (FIG. 1) and its upper bead 14 positioned in correspondence with the lower edge of the respective seat (FIGS. 1 and 4).

The tire fitter grips the handgrips 12, lowers the handlebar against the resistance offered by the gas spring 66, and positions the nozzles as in FIG. 4, with their outsides pressing against the side wall of the tire 15, their exit mouths generally facing the bead 14, and their right angled recesses engaged with the outer edge of the bead retention flange 55.

Having done this, and while continuing to maintain the handlebar thrust downwards, he operates both the members 18, with the result that the compressed air enters the tire 15 and urges the bead 14 into its seat.

In this respect, with reference to FIG. 5, on simultaneously operating the two members 18 the compressed air is able to reach the change-over valve 273, which opens. Said opening enables the compressed air present in the vent conduit 174 to discharge, so that the valve 272 opens to feed the air to the hoses 17 connected to the handles 9.

When the tire fitter releases the members 18 and the handgrips 12, the pneumatic system automatically assumes the configuration of FIG. 5, with the handlebar rising without aid.

What is claimed is:

1. A device for bead engagement and inflation of a tubeless tire on a wheel rim, the device being adapted for use on a tire removal machine having a unit for supporting and locking the wheel rim, wherein the device is adapted to move between a first rest position away from the unit and a second working position near to the unit, said device comprising:

a handlebar having two handles and two handgrips on the two handles respectively located at ends of the handlebar; each of the two handles being provided with at least one compressed air delivery nozzle and each of the two handgrips provided with a control member to activate delivery of compressed air to the at least one compressed air delivery nozzle respectively on the two handles;

said control members being connected in series to a common valve unit so that the compressed air reaches the compressed air delivery nozzles only when said two control members are simultaneously activated;

said delivery nozzles being adapted to be positioned in a gap between the wheel rim and tire when the device is in the second working position.

2. The device as claimed in claim 1, wherein said device is supported in the first rest position above said unit by an automatic repositioning system generally of counterweight type.

3. The device as claimed in claim 1, wherein said handles are pivoted to the handlebar so that a distance between the respective compressed air delivery nozzles can be adjusted while maintaining symmetry.

4. The device as claimed in claim 3, wherein said handles are connected together by a connection rod the longitudinal axis thereof lying in the same plane containing the axes on which the handles are pivoted to the handlebar.

5. The device as claimed in claim 1, wherein each compressed air delivery nozzle has an exit mouth oriented towards the axis of the unit while the device is in the second working position.

6. The device as claimed in claim 5, presenting on the inner side of each individual nozzle to the rear of its exit mouth, a recess which creates a seat for its resting against the outer edge of the flange of said wheel rim.

* * * * *